(12) United States Patent
Hido et al.

(10) Patent No.: US 8,887,146 B2
(45) Date of Patent: Nov. 11, 2014

(54) SYSTEM FOR INSPECTING INFORMATION PROCESSING UNIT TO WHICH SOFTWARE UPDATE IS APPLIED

(75) Inventors: Shohei Hido, Kanagawa (JP); Seiji Munetoh, Kanagawa (JP); Shoko Suzuki, Kanagawa (JP); Naohiko Uramoto, Kanagawa (JP); Sachiko Yoshihama, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 13/435,612

(22) Filed: Mar. 30, 2012

(65) Prior Publication Data

US 2012/0254850 A1  Oct. 4, 2012

(30) Foreign Application Priority Data

Mar. 31, 2011  (JP) ................................ 2011-078466

(51) Int. Cl.
- *G06F 9/45* (2006.01)
- *G06F 9/445* (2006.01)
- *G06F 21/56* (2013.01)
- *G06F 9/44* (2006.01)
- *G06F 11/14* (2006.01)

(52) U.S. Cl.
CPC .............. *G06F 8/65* (2013.01); *G06F 11/1433* (2013.01); *G06F 21/566* (2013.01); *G06F 2221/033* (2013.01)
USPC ......................................... 717/168; 717/174

(58) Field of Classification Search
None
See application file for complete search history.

(56) References Cited

U.S. PATENT DOCUMENTS

| | | | | |
|---|---|---|---|---|
| 7,216,343 | B2 * | 5/2007 | Das et al. | 717/168 |
| 7,490,319 | B2 * | 2/2009 | Blackwell et al. | 717/124 |
| 7,810,091 | B2 * | 10/2010 | Gartside et al. | 717/177 |
| 7,818,739 | B2 * | 10/2010 | Cox et al. | 717/171 |
| 8,479,292 | B1 * | 7/2013 | Linhardt | 726/23 |
| 8,578,362 | B2 * | 11/2013 | Brescia | 717/168 |
| 8,739,128 | B1 * | 5/2014 | Cohen et al. | 717/124 |
| 2001/0049263 | A1 * | 12/2001 | Zhang | 455/67.1 |
| 2006/0253848 | A1 * | 11/2006 | Mathieu et al. | 717/168 |
| 2008/0168435 | A1 * | 7/2008 | Tupman et al. | 717/173 |

(Continued)

FOREIGN PATENT DOCUMENTS

CN  101770376 A * 7/2010 .............. G06F 9/445

OTHER PUBLICATIONS

Title "StealthyMalwareDetectionandMonitoringthroughVMM-Based"Out-of-the-Box"SemanticViewReconstruction", author: Xuxian Jiang et al., Published in "ACM Transactions on Information and System Security, vol. 13, No. 2, Article12, Publicationdate:Feb. 2010."*

(Continued)

*Primary Examiner* — Don Wong
*Assistant Examiner* — Hossain Morshed
(74) *Attorney, Agent, or Firm* — Ido Tuchman; Gail H. Zarick

(57) ABSTRACT

A method and an inspection apparatus for inspecting an information processing unit to which software update is applied. The apparatus includes a collection component configured to collect the behavior, for a plurality of times of software update, of the information processing unit to which one software update is applied. The apparatus also includes a determination component configured to compare the behavior collected for the plurality of times of software update to one another to determine whether the behavior of the information processing unit after the one software update is applied thereto is normal.

17 Claims, 6 Drawing Sheets

(56) References Cited

U.S. PATENT DOCUMENTS

| | | | |
|---|---|---|---|
| 2009/0007105 A1* | 1/2009 | Fries et al. | 718/1 |
| 2009/0222468 A1* | 9/2009 | Alpern et al. | 707/101 |
| 2009/0249002 A1* | 10/2009 | Imahara et al. | 711/161 |
| 2010/0114825 A1* | 5/2010 | Siddegowda | 707/638 |
| 2011/0023120 A1* | 1/2011 | Dai et al. | 726/23 |
| 2012/0014259 A1* | 1/2012 | Nogami | 370/241 |
| 2012/0254850 A1* | 10/2012 | Hido et al. | 717/168 |
| 2013/0247196 A1* | 9/2013 | Brando et al. | 726/23 |

OTHER PUBLICATIONS

Jiang et al., "Stealthy Malware Detection and Monitoring through VMM-Based "Out-of-the-Box" Semantic View Reconstruction", ACMTransactions on Information and System Security, vol. 13, No. 2, Article 12, Publication date: Feb. 2010.*

Li, P., Gao, D., & Reiter, M., "Automatically Adapting a Trained Anomaly Detector to Software Patches", Lecture Notes in Computer Science, vol. 5758/2009, 2009, p. 142-160.

Stavrou, A., Cretu-Ciocarlie, G. F., Locasto, M. E., & Stolfo, S. J., "Keep your friends close: the necessity for updating an anomaly sensor with legitimate environment changes", Proceedings of the 2nd ACM workshop on Security and artificial intelligence, 2009, p. 29-46.

* cited by examiner

# SYSTEM FOR INSPECTING INFORMATION PROCESSING UNIT TO WHICH SOFTWARE UPDATE IS APPLIED

CROSS-REFERENCE TO RELATED APPLICATIONS

This application claims priority under 35 U.S.C. §119 to Japanese Patent Application No. JP 2011-078466 filed Mar. 31, 2011, the entire text of which is specifically incorporated by reference herein.

TECHNICAL FIELD

The present invention relates to an apparatus, system, and program for inspecting an information processing unit to which a software update is applied.

BACKGROUND

Computing systems in which a plurality of information processing units are connected to a network are known. In these computing systems, software versions update, settings change, etc. are executed for each of the information processing units at any time.

Such computing systems monitor for unauthorized access (for example, invasion by an external unauthorized person, an attack with malware, etc.) to the information processing units. If unauthorized access is detected, the computing systems, for example, eliminate the unauthorized access.

BRIEF SUMMARY

Embodiments of the invention address the technical problem of unauthorized access to a computing system includes an attack with malware, which is software or code that exhibits abusive behavior. Some malware launches an attack at the time at which a software update is applied to the information processing units.

If malware launches an attack at such time, an unauthorized-access detection system sometimes mistakenly determines that unauthorized behavior due to the malware is a change of behavior due to an authorized software update. In contrast, if detection sensitivity to such malware is set to be high, a change of behavior due to an authorized software update to the information processing units is sometimes mistakenly detected as unauthorized behavior due to malware. Thus, it may be required for computing systems to be able to distinguish an attack with unauthorized access from an authorized software update to the information processing units.

To solve the above problem, in aspects of the present invention, an inspection apparatus is provided to inspect an information processing unit to which a software update is applied. The apparatus may include a collection component configured to collect the behavior, for a plurality of times of software update, of the information processing unit to which one software update is applied. The apparatus may also include a determination component configured to compare the behavior collected for the plurality of times of software update to one another to determine whether the behavior of the information processing unit after the one software update is applied thereto is normal and a method and program for the same.

The summary of the present invention described above does not recite all features of the present invention. The present invention also includes a subcombination of these features.

DETAILED DESCRIPTION

Although the present invention will be described below based on embodiments of the present invention, it is to be understood that the embodiments do not limit the scope of the claims of the present invention and that all of the features described in the embodiments may not be absolutely necessary for the solutions of the present invention.

Figure 1:
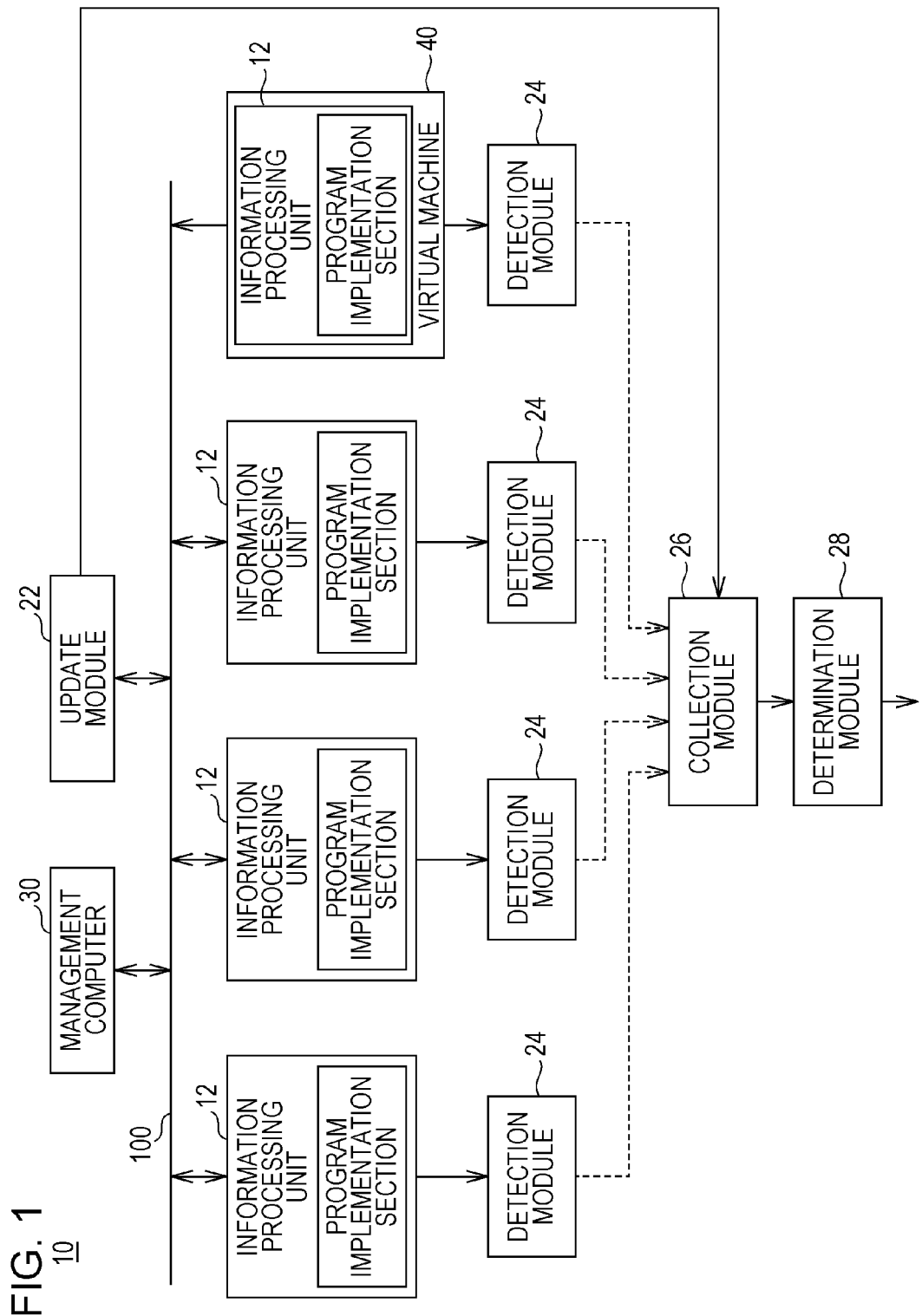
FIG. 1 illustrates the functional configuration of a computing system 10 according to an example embodiment.

FIG. 1 illustrates the functional configuration of a computing system 10 according to an example embodiment. An example of the computing system 10 is an industrial control system (ICS) that manages and controls the individual objects of an industrial system or an infrastructure (traffic, energy, etc.) system. Another example of the computing system 10 according to this embodiment is a system that manages various devices connected to a network in an office or home (for example, a telephone and a copying machine). The computing system 10 may be a system that manages a plurality of computers connected to a network in a company etc, or alternatively, a system that manages a large number of servers connected to a network in a data center or the like.

The computing system 10 may include a plurality of information processing units 12, an update component 22, a plurality of detection components 24, a collection component 26, a determination component 28, and a management computer 30. In the computing system 10, the detection components 24, the collection component 26, and the determination component 28 may function as inspection apparatuses that inspect the information processing units 12 to which a software update is applied for unauthorized access.

The individual information processing units 12 execute a program to process data and control devices. The individual information processing units 12 may be either computers or data processing units installed in devices. One example of the information processing units 12 is a programmable logic controller (PLC) that controls the devices.

The information processing units 12 may be implemented by corresponding virtual machines 40 that are each executed on a computer. In this case, the virtual machines 40 virtually implement the hardware configuration of the corresponding information processing units 12.

The update component 22 may apply a software update to designated information processing units 12 of the information processing units 12. In one embodiment, the software update refers to configuration change processing on the information processing units 12, which involves no hardware change. In the case where the information processing units 12 are implemented by the virtual machines 40, the software update may include configuration change processing, which involves no change of hardware configuration that is virtually implemented by the virtual machines 40. Examples of the software update include installation of programs that the information processing units 12 execute, a version update of the programs that the information processing units 12 execute, software patching to the programs, such as security patching, and change of setting values of the information processing units 12.

For example, the update component 22 may give a command to apply specified software update to one information processing unit 12 designated by, for example, a host system. The information processing unit 12 given the software update command from the update component 22 may acquire data necessary for the software update via, for example, a network 100, and may execute the software update, such as installation of a program, or update or change of setting of a program. Thus, the update component 22 can apply the specified software update to the designated one information processing unit 12. When the software update is applied to any of the information processing units 12, the update component 22 notifies the collection component 26 of the fact.

The individual detection components 24 may be provided in one-to-one correspondence with the information processing units 12. In one embodiment, the detection components 24 detect predetermined kinds of data regarding the corresponding information processing units 12. Each of the detection components 24 may be either a physical sensor implemented as a unit separated from corresponding one of information processing units 12 or an information acquisition software module implemented as part of the corresponding information processing unit 12.

More specifically, as an example, each of the detection components 24 detects, for example, data that corresponding one of the information processing units 12 transmits and receives, a program and a function that the corresponding information processing unit 12 implements, and data that the corresponding information processing unit 12 writes to and reads from a memory. Each of the detection components 24 detects, for example, the states of resources constituting the information processing unit 12 (for example, the amount of memory used, processor use rate, and the state of the other resources that the information processing unit 12 has), the order in which a system call is called in the information processing unit 12, and the physical quantities influenced by the operation of devices that the corresponding information processing unit 12 controls (for example, electric power, temperature, humidity, and fluid flow rate).

The collection component 26 may collect the behavior of the information processing unit 12 to which software update is applied, which are influenced by the application of the software update. The behavior of the information processing unit 12 refers to the behavior of data and the behavior of physical quantities influenced by implementation of a program by the information processing units 12.

Examples of the behavior of the information processing unit 12 include the behavior of data that the information processing unit 12 transmits and receives, the behavior of a program and a function that the information processing unit 12 implements, and the behavior of data that the information processing unit 12 writes to and reads from a memory. Other examples of the behavior of the information processing unit 12 include the behavior of the states of resources constituting the information processing unit 12, the behavior of calling a system call in the information processing unit 12, and the behavior of the physical quantities influenced by the operation of devices that the information processing unit 12 controls.

As an example, the collection component 26 collects the behavior of the information processing unit 12 to which software update is applied by receiving detection results from the detection component 24 corresponding to the information processing unit 12. The collection component 26 may receive the detection results either via a dedicated line connecting the detection component 24 and the collection component 26 together or via the network 100.

The determination component 28 may compare the behavior of the information processing unit 12 to which software update is applied for individual software updates. For example, the determination component 28 compares the behavior of the plurality of information processing units 12 to which software update is applied. As another example, the determination component 28 compares the behavior of one information processing unit 12, to which one software update is repeatedly applied, a plurality of times.

For example, the determination component 28 determines whether the behavior of data transmission and reception of the information processing unit 12 match. More specifically, the determination component 28 may determine whether data transmission and reception timings and the content of data that the information processing unit 12 transmits and receives match. The determination component 28 determines whether the times at which files are added, moved, and rewritten by the information processing unit 12 match and whether the contents of the files match. The determination component 28 compares whether the times at which database entries are added, moved, and rewritten by the information processing unit 12 match and whether the contents of the database entries match. The determination component 28 may compare whether the timings at which registry keys or registry values are added, moved, and rewritten by the information processing unit 12 match.

Furthermore, for example, the determination component 28 determines whether the behavior of programs and functions that the information processing unit 12 implements match. More specifically, the determination component 28 may determine whether the content of programs that the information processing unit 12 implements and execution timings thereof match, or whether the timings or parameters of calls of the application program interface (API) for such programs match.

Furthermore, for example, the determination component 28 determines whether the behavior of the information processing unit 12 when it writes data to or read data from a memory match. More specifically, the determination component 28 determines whether the timings at which the information processing unit 12 writes data to and reads data from the memory and the content of data match.

Furthermore, for example, the determination component 28 determines whether the states of resources that constitute the information processing unit 12 (for example, memory usage and processor use rate) match. More specifically, the determination component 28 may determine whether changes in usage of a memory or changes in use rate of a processor, which constitute the information processing unit 12, match.

Furthermore, for example, the determination component 28 determines whether the behavior of physical quantities influenced by the operation of devices that the information processing unit 12 controls match. More specifically, the determination component 28 may determine whether the values or changes of the physical quantities (for example, electric power, temperature, humidity, and fluid flow rate) influenced by the operation of devices that the information processing unit 12 controls match.

The determination component 28 may then determine whether the behavior of the information processing unit 12 after the software update is applied is normal on the basis of the determination results. That is, if the behavior of the information processing unit 12 to which a plurality of times of software update are applied match, the determination component 28 determines that the behavior is normal. If the behavior of the information processing unit 12 to which software updates are applied do not match, the determination component 28 determines that some of the behavior is not normal.

As an example, the management computer 30 implements management and control of the entire computing system 10. Furthermore, if the computing system 10 is subjected to unauthorized access, the management computer 30 executes the process of eliminating the unauthorized access.

Figure 2:
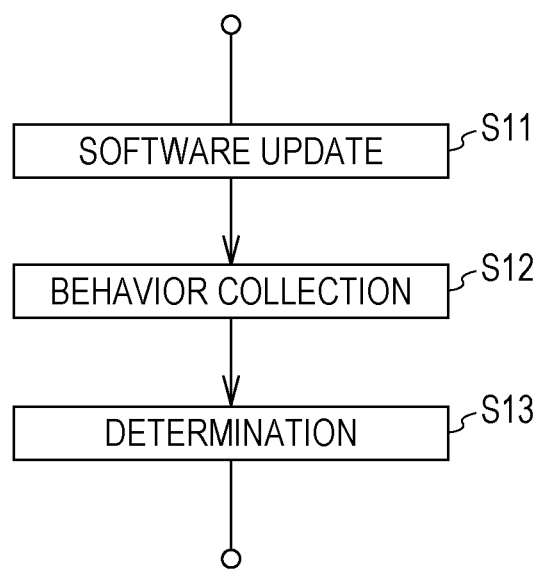
FIG. 2 shows a processing flow of the computing system 10 according to an example embodiment.

FIG. 2 shows a processing flow of the computing system 10 according to an example embodiment. In step S11, the update component 22 may apply a plurality of times of software update to a specific information processing unit 12 in the computing system 10 in accordance with an instruction from the management computer 30 or the like that manages the computing system 10.

Here, the application of a plurality of times of software update to a specific information processing unit 12 may include the process of applying software update to each of the same kind of plurality of information processing units 12. The application of a plurality of times of one software update to an information processing unit 12 also includes, for example, the process of repeating the process of backing up the state of the information processing unit 12, applying one software update thereto, thereafter restoring the information processing unit 12 to the state before the software update, and applying one software update thereto.

Furthermore, the application of a plurality of times of software update to an information processing unit 12 also includes, for example, the process of applying a software update to an information processing unit 12, and applying the same software update to the virtual machine 40 that virtually implements the process of the information processing unit 12 before the software update. Examples in which a plurality of times of software update is applied to information processing unit 12 will be described with reference to FIGS. 3 to 5.

Subsequently, in step S12, the collection component 26 may collect the behavior of the information processing unit 12 to which software update is applied for each of plurality of times of software update. As an example, the collection component 26 collects the behavior of the plurality of information processing units 12, in real time, to which one software update is applied. As another example, the determination component 28 may temporarily accumulate the behavior of the plurality of information processing units 12 to which one software update is applied in a storage unit and may collect the accumulated behavior of the information processing units 12. The determination component 28 may implement an image of the configuration of the information processing units 12 using virtual machines and may collect the behavior of the virtual machines.

Subsequently, in step S13, the determination component 28 may compare the behavior collected for each of plurality of times of software update. The determination component 28 determines whether the behavior of the information processing unit 12 after one software update is applied thereto is normal. More specifically, if the collected behavior match within a fixed range, the determination component 28 determines that the behavior of the information processing unit 12 after one software update is applied is normal. If the plurality of behavior does not match (do not match within a fixed range), the determination component 28 determines that the behavior of one information processing unit 12 after one software update is applied is abnormal.

In step S13, the determination component 28 may compare the behavior collected for each of plurality of times of software update after one software update is applied until at least the behavior that is potentially affected by the software update is observed. For example, in the case where the version of a program for rewriting a file once a day is updated, the determination component 28 compares the behavior of the plurality of information processing units 12 at least for one day (for example, file read processing by the program).

The determination component 28 may notify the management computer 30 or the like that executes the process of eliminating unauthorized access of the determination result. The notified management computer 30 may verify whether the corresponding information processing unit 12 is subjected to unauthorized access, and if it is subjected to unauthorized access, the management computer 30 may execute unauthorized-access elimination processing.

As described above, with the computing system 10, anomalies of the information processing units 12 after software update is applied thereto can be detected. In particular, since the computing system 10 may observe only the behavior of the information processing units 12, the computing system 10 can accurately detect anomaly without analyzing the internal states of the information processing units 12.

In step S11, the update component 22 may apply one specific software update only to some of the same kind of information processing units 12 in the computing system 10. The update component 22 may apply the same software update to the other information processing units 12 of the same kind under the condition that the behavior of the information processing units 12 to which the one software update is applied are determined to be normal by the determination component 28.

In this case, the determination component 28 may determine whether the behavior of the other information processing units 12 after one software update is applied thereto are normal using a criterion changed from a criterion used for determining whether the behavior of some of the information processing units 12 after the one software update is applied is normal. For example, the determination component 28 may shift, expand, or reduce the range of behavior that is determined to be normal from the range before the software update.

Thus, after confirming that one software update is applied normally to some of the information processing units 12, the computing system 10 can apply the same software update to the other information processing units 12. Furthermore, since the computing system 10 can recognize a normal behavior after one software update is applied, the computing system 10 can easily and accurately determine whether the behavior of the other information processing units 12 to which the one software update is applied thereafter is normal. Thus, the computing system 10 can minimize damage due to unauthorized access.

Figure 3:
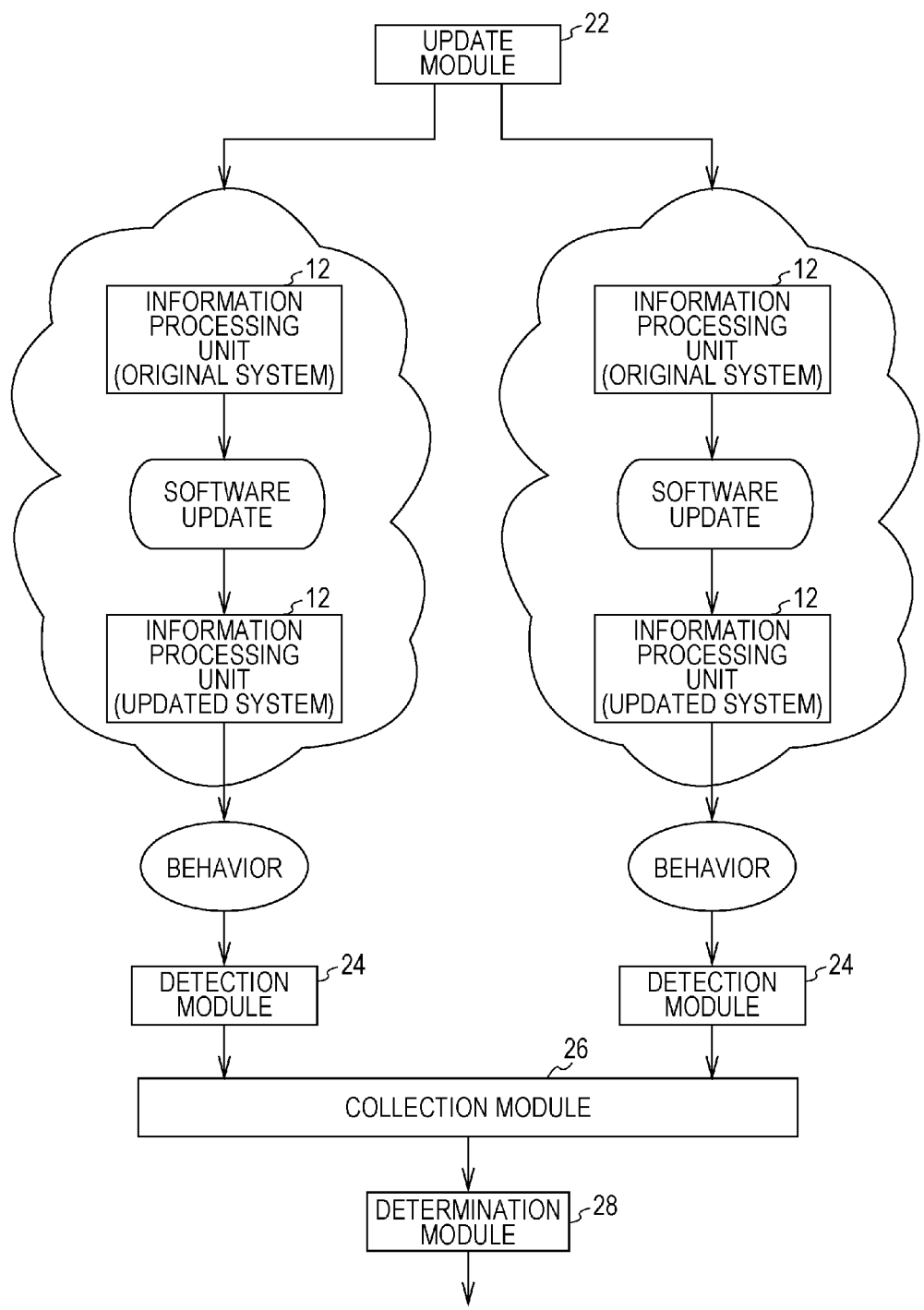
FIG. 3 shows example 1 of a method for collecting the behavior of information processing units 12 for a plurality of times of software update.

FIG. 3 shows example 1 of a method for collecting the behavior of the information processing units 12 for a plurality of times of software update. In example 1, the update component 22 applies one software update to each of the same kind of actual information processing units 12.

For example, the update component 22 applies one software update to the plurality of information processing units 12 in which at least one of the system configuration, setting, and operating environment is common. An example of information processing units 12 with the same system configuration is information processing units 12 whose hardware configuration, software configuration, and the like are common. An example of information processing units 12 whose settings are common is information processing units 12 in which the setting values for hardware, the setting values for software, and the like are common. Information processing units 12 in which the installation site is common are information processing units 12 in which the installation location, the kinds of devices that are controlled by the information processing units 12, the operating time zones, and the like are common.

The collection component 26 may collect the behavior of such same kind of information processing units 12 to which the same software update is applied. As an example, the collection component 26 collects the behavior of the information processing units 12 to which the same software update is applied in a state in which the information processing units 12 are operating under an actual environment.

Thus, the collection component 26 can collect the behavior of the information processing units 12 for the plurality of software update applications. The determination component 28 may then compare the behavior of the individual information processing units 12 that are acquired by the collection component 26.

Since the computing system 10 according to example 1 collects the behavior of the information processing units 12 operating under an actual environment, the computing system 10 can easily detect anomalies of the information processing units 12 after software update is applied thereto without a special detection mechanism. The computing system 10 of example 1 can accurately detect anomalies of the information processing units 12 in real time after software update is applied.

Figure 4:
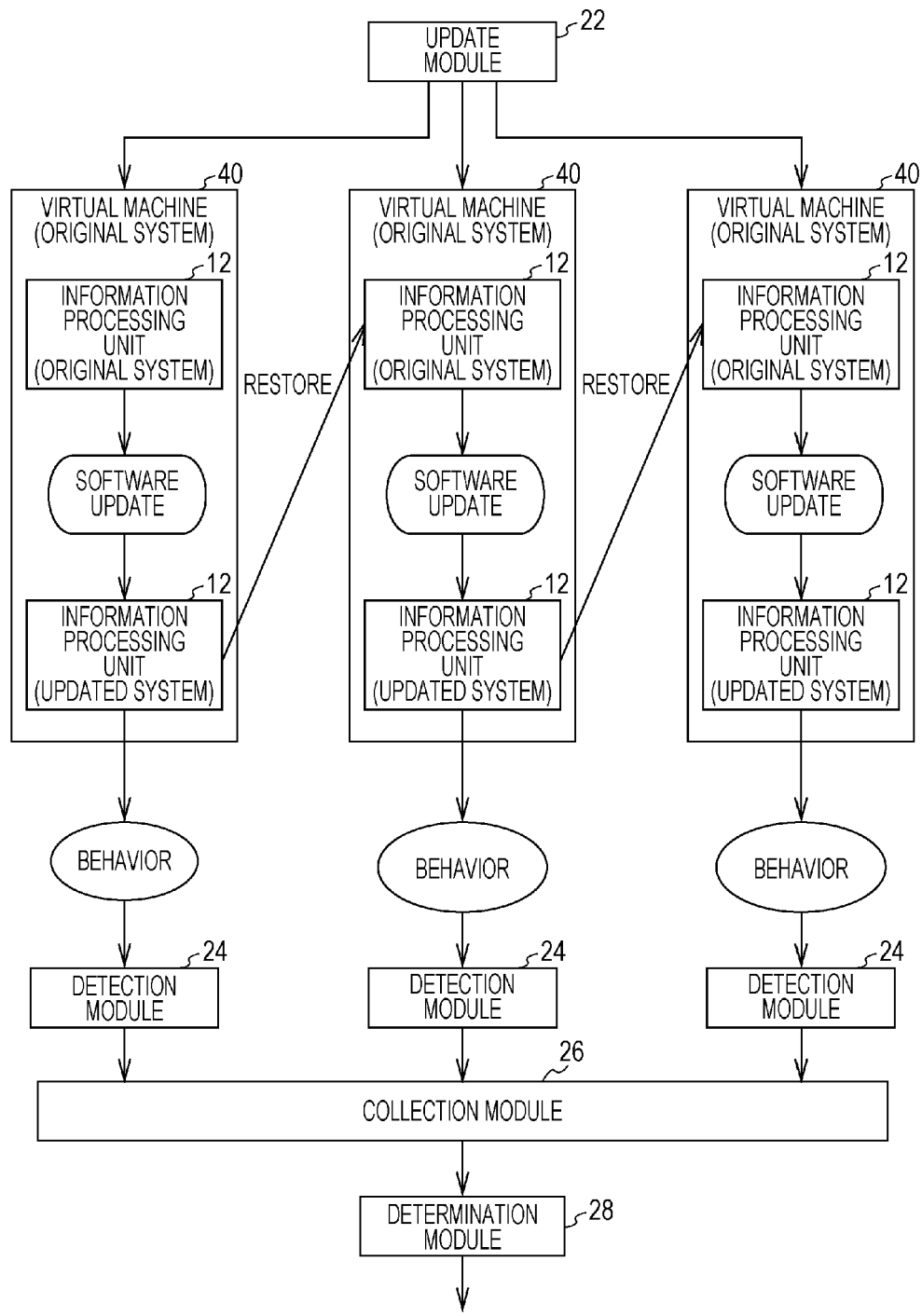
FIG. 4 shows example 2 of a method for collecting the behavior of the information processing units 12 for a plurality of times of software update.

FIG. 4 shows example 2 of a method for collecting the behavior of the information processing units 12 for a plurality of times of software update. In example 2, the update component 22 repeats the process of applying one software update to one information processing unit 12 after backing up the state thereof and applying the same software update after restoring the one information processing unit 12 to the state before the software update.

For example, the update component 22 stores an image of the virtual machine 40 that virtually implements the configuration of one information processing unit 12. The update component 22 may then repeat the process of applying the one software update to the virtual machine 40 that implements the configuration of the stored image a plurality of times. Thus, the update component 22 can repeat the process of restoring one information processing unit 12 to the state before software update and then applying the same software update for a plurality of times.

The collection component 26 may collect the behavior of one information processing unit 12 for a plurality of times of a software update applied to the one information processing unit 12. As an example, the collection component 26 applies one software update to the individual information processing units 12 implemented by the corresponding virtual machines 40 and operates the information processing units 12 under the identical operating environment as an actual operating environment. As an example, the collection component 26 operates the individual information processing unit 12 implemented by the virtual machine 40 for a fixed period under an environment in which the operating environment of the information processing units 12 is virtualized (for example, an environment in which the same input data as that of the information processing units 12 is given and an environment in which a set of virtualized devices that correspond to the actual devices controlled by the information processing units 12 are controlled) and collects the behavior thereof.

Thus, the collection component 26 can collect the behavior for the individual plurality of times of software update from the virtual machines 40 that virtually implement the corresponding information processing units 12. The determination component 28 compares the behavior of the information processing units 12, acquired by the collection component 26, that are virtually implemented by the corresponding virtual machines 40.

Since the computing system 10 according to example 2 detects the behavior of the information processing units 12 using the virtual machines 40, one software update can be applied to one information processing unit 12 a plurality of times at different timings. Thus, even if the number of the same kind of information processing units 12 is very small in the computing system 10, an anomaly after software update is applied can easily be detected without a special detection mechanism. If the information processing units 12 are attacked by malware that launches an action depending on the timing of software update, the computing system 10 can detect the attack.

Figure 5:
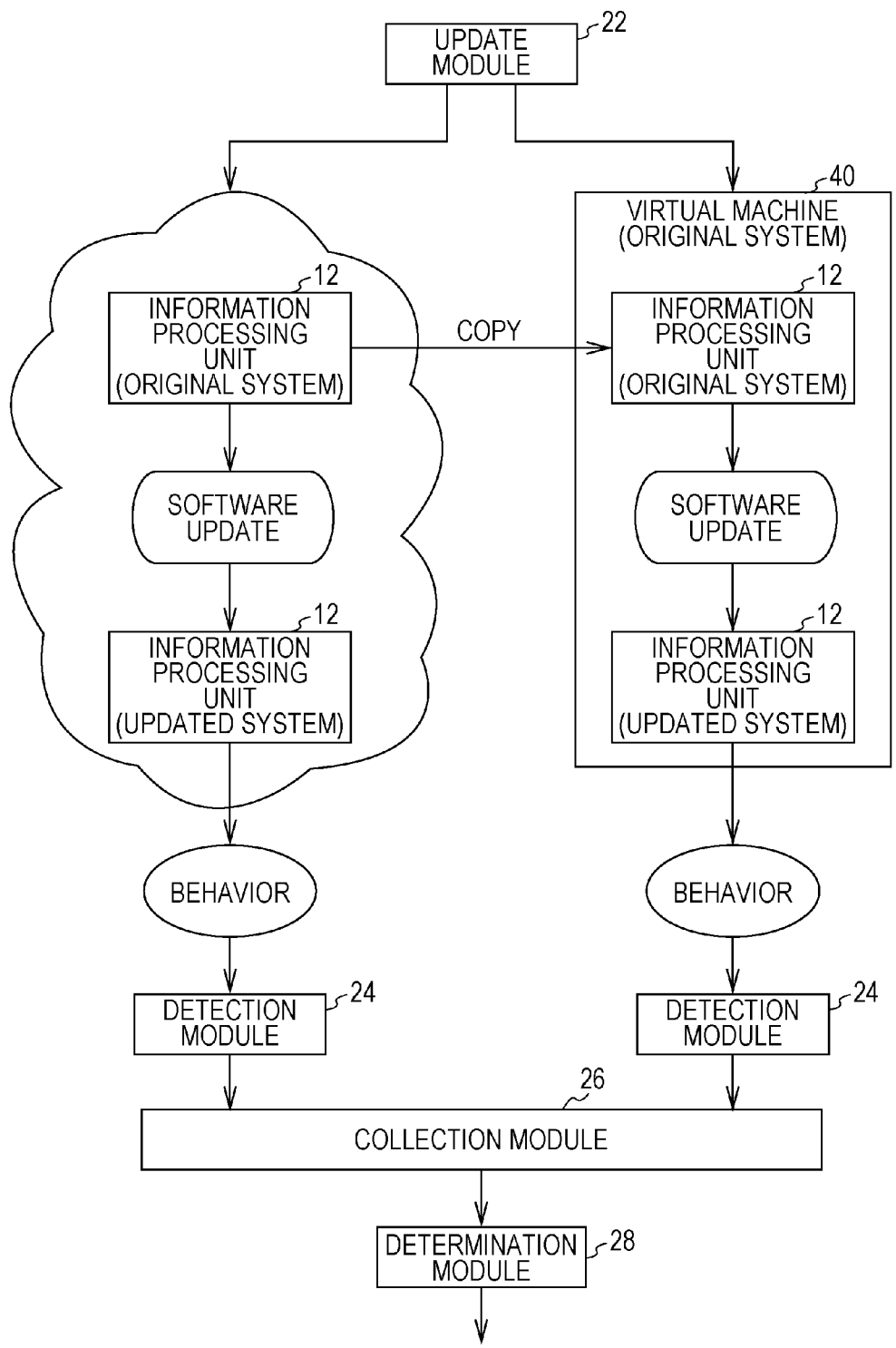
FIG. 5 shows example 3 of a method for collecting the behavior of the information processing unit 12 for a plurality of times of software update.

FIG. 5 shows example 3 of a method for collecting the behavior of the information processing unit 12 for a plurality of times of software update. In example 3, the update component 22 duplicates an image of the configuration of one actual information processing unit 12 provided in the computing system 10 onto the virtual machine 40 to virtually implement a duplicate of the configuration of the information processing unit 12. Subsequently, the update component 22 may apply one software update to the actual information processing unit 12 and may apply the same software update to the information processing unit 12 implemented by the virtual machine 40.

The collection component 26 may collect the behavior of the actual information processing unit 12 to which the software update is applied and the behavior of the information processing unit 12 implemented by the virtual machine 40 to which the same software update is applied. As an example, the collection component 26 may operate the actual information processing unit 12 under an actual environment. Furthermore, the collection component 26 may operate one information processing unit 12 implemented by the virtual machine 40 to which the one software update is applied under the identical operating environment as the actual operating environment. As an example, the collection component 26 operates one information processing unit 12 implemented by the virtual machine 40 for a fixed period under an environment in which the operating environment of the information processing units 12 is virtualized (for example, an environment in which the same input data as that of the information processing units 12 is given and an environment in which a set of virtualized devices that correspond to the actual devices controlled by the information processing units 12 are controlled) and collects the behavior of the virtual machine 40.

Thus, the collection component 26 can collect the behavior of the virtual machine 40 that duplicates the information processing unit 12. The determination component 28 may compare the behavior of one actual information processing unit 12, which is collected by the collection component 26, and the behavior of the information processing unit 12 implemented by the virtual machine 40 to each other.

If the behavior of the actual one information processing unit 12 and the behavior of the one information processing unit 12 implemented by the virtual machine 40 match, the determination component 28 determines that the behavior of the one information processing unit 12 to which the one software update is applied is normal. In contrast, if they do not match, the determination component 28 determines that the behavior of the information processing unit 12 to which the software update is applied is not normal.

Since the computing system 10 according to example 3 detects the behavior of the information processing unit 12 using the virtual machine 40, the same software update can be applied to the information processing unit 12 a plurality of times. Thus, even if the number of the same kind of information processing units 12 is very small in the computing system 10, an anomaly after software update is applied can easily be detected without a special detection mechanism. Furthermore, since the computing system 10 collects the behavior of the information processing unit 12 operating under an actual environment, an anomaly of the information processing unit 12 after software update is applied can be accurately detected at real time.

Figure 6:
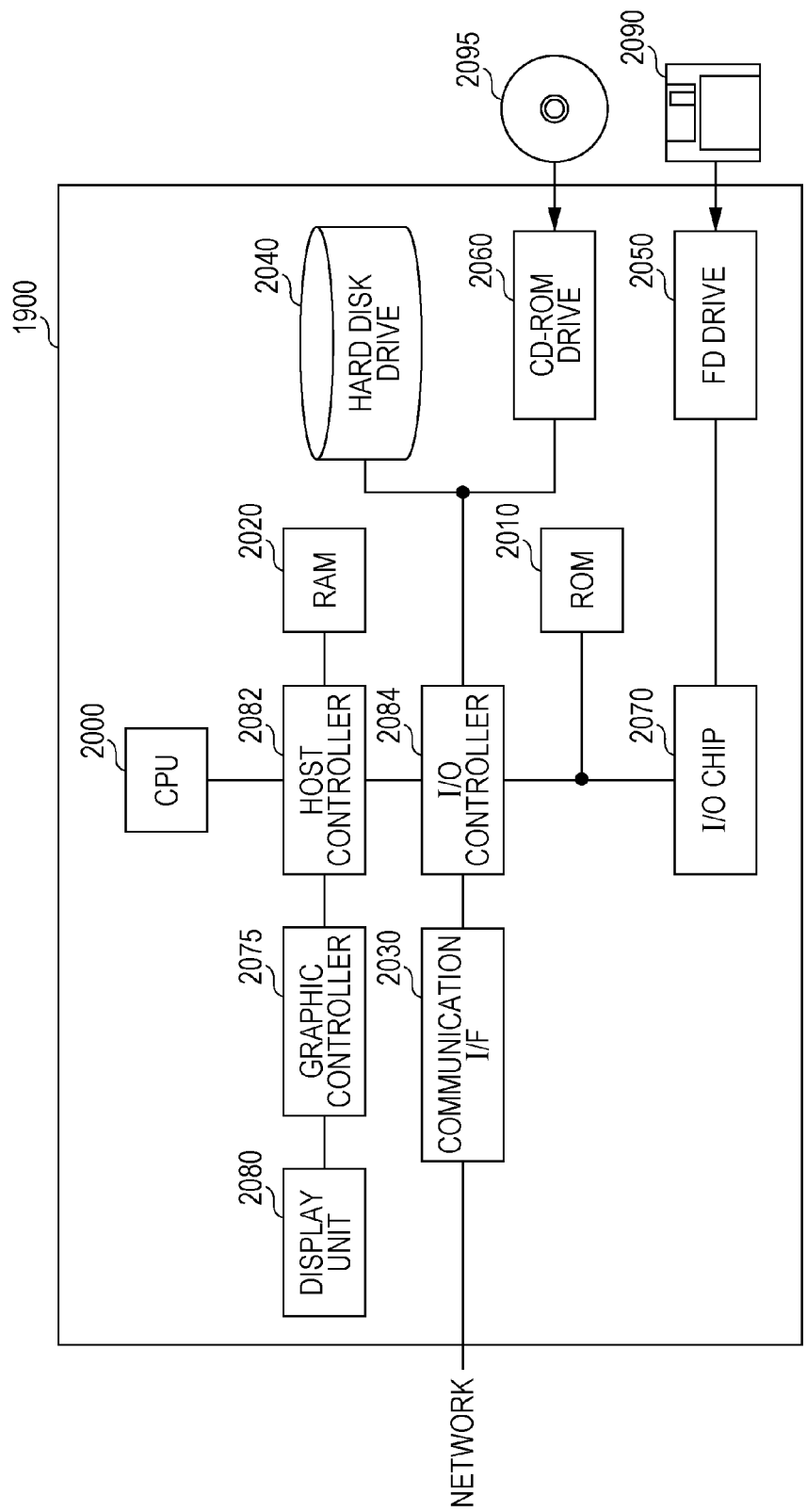
FIG. 6 shows an example of the hardware configuration of a computer 1900 according to an embodiment.

FIG. 6 shows an example of the hardware configuration of a computer 1900 according to an embodiment. The computer 1900 according to this embodiment is equipped with CPU peripherals including a CPU 2000, a RAM 2020, a graphic controller 2075, and a display 2080 which are mutually connected by a host controller 2082; an input-output component including a communication interface 2030, a hard disk drive 2040, and a CD-ROM drive 2060 which are connected to the host controller 2082 by an input-output controller 2084; and a legacy input-output component including a ROM 2010, a flexible disk drive 2050, and an input-output chip 2070 connected to the input-output controller 2084.

The host controller 2082 may connect the RAM 2020, the CPU 2000 that accesses the RAM 2020 at a high transfer rate, and the graphic controller 2075 together. The CPU 2000 operates on the basis of programs stored in the ROM 2010 and the RAM 2020 to control the individual components. The graphic controller 2075 acquires image data that the CPU 2000 or the like creates on a frame buffer in the RAM 2020 and displays it on the display 2080. Alternatively, the graphic controller 2075 may have therein a frame buffer in which image data that the CPU 2000 or the like creates is stored.

The input-output controller 2084 connects the host controller 2082, the communication interface 2030 which is a relatively high-speed input-output interface, the hard disk drive 2040, and the CD-ROM drive 2060 together. The communication interface 2030 communicates with other devices via a network. The hard disk drive 2040 stores programs and data that the CPU 2000 in the computer 1900 uses. The CD-ROM drive 2060 reads programs or data from the CD-ROM 2095 and provides them to the hard disk drive 2040 via the RAM 2020.

Furthermore, the input-output controller 2084 connects to relatively low-speed input-output interfaces, that is, the ROM 2010, the flexible disk drive 2050, and the input-output chip 2070. The ROM 2010 stores a boot program that the computer 1900 executes at startup and/or programs and so on that depend on the hardware of the computer 1900. The flexible disk drive 2050 reads programs or data from a flexible disk 2090 and provides them to the hard disk drive 2040 via the RAM 2020. The input-output chip 2070 connects the flexible disk drive 2050 to the input-output controller 2084 and connects various input-output interfaces to the input-output controller 2084 via a parallel port, a serial port, a keyboard, a mouse port, and so on.

Programs provided to the hard disk drive 2040 via the RAM 2020 are stored in a recording medium, such as the flexible disk 2090, the CD-ROM 2095, or an IC card, and are used by the user. The programs are read from the recording medium, are installed in the hard disk drive 2040 in the computer 1900 via the RAM 2020, and are executed by the CPU 2000.

The programs that are installed in the computer 1900 to cause the computer 1900 to function as an inspection apparatus may include an update module, a collection module, and a determination module. These programs or modules may work the CPU 2000 and so on to cause the computer 1900 to function as an inspection apparatus.

Information processing described in these programs is read by the computer 1900, so that it functions as the update component 22, the collection component 26, and the determination component 28 which are tangible means in which software and the foregoing various hardware resources cooperate. By implementing operation or processing of information according to the purpose of usage of the computer 1900 of this embodiment by these tangible means, a specific inspection apparatus according to the purpose of usage is established.

As an example, when the computer 1900 communicates with an external device, the CPU 2000 implements a communication program loaded on the RAM 2020 and issues an instruction to perform communication processing to the communication interface 2030 on the basis of processing details described in the communication program. The communication interface 2030 reads transmission data stored in a transmission buffer area or the like provided on a storage unit, such as the RAM 2020, the hard disk drive 2040, the flexible disk 2090, or the CD-ROM 2095, and transmits the date to the network, or writes data received via the network into a reception buffer area or the like on the storage unit under the control of the CPU 2000. Thus, the communication interface 2030 may either transfer transmitted and received data to and from the storage unit using a direct memory access (DMA) method or may transfer transmitted and received data by the CPU 2000 reading data from the transfer source storage unit or the communication interface 2030 and writing the data to the transfer destination communication interface 2030 or the storage unit.

Furthermore, the CPU 2000 may read all or specified data from a file or database stored in a storage unit, such as the hard disk drive 2040, the CD-ROM drive 2060 (CD-ROM 2095), the flexible disk drive 2050 (flexible disk 2090), into the RAM 2020 by means of DMA transfer or the like, and performs various processes on the data in the RAM 2020. The CPU 2000 writes the processed data back into the storage unit by means of DMA transfer or the like. In such processing, since the RAM 2020 can be assumed to temporarily store the content of the storage unit, the RAM 2020 and the storage units in this embodiment are generically referred to as a memory, a storage component, or a storage unit. Various information in this embodiment, such as programs, data, tables, and databases, are stored in such a storage unit and is subjected to information processing. The CPU 2000 can store part of data in the RAM 2020 in a cache memory and can read and write the data on the cache memory. Since the cache memory takes part of the functions of the RAM 2020 in such a configuration, the cache memory in this embodiment is also included in the RAM 2020, the memory and/or the storage unit except in cases where they are distinguished.

Furthermore, the CPU 2000 performs various processes on data read from the RAM 2020, including various operations, information processing, condition determination, and information search and replacement described in this embodiment, which are designated by a program instruction sequence, and writes the data back into the RAM 2020. For example, for condition determination, the CPU 2000 determines whether various variables shown in this embodiment satisfy conditions, such as whether they are larger, smaller, greater than or equal to, less than or equal to, or equal to other variables or constants, and if the conditions are satisfied (or are not satisfied), the CPU 2000 branches to a different instruction sequence or calls a subroutine.

Furthermore, the CPU 2000 can search for information stored in a file or database in the storage unit. For example, in the case where a plurality of entries in which the value of a first attribute and the value of a second attribute are associated with each other are stored in the storage unit, the CPU 2000 searches the entries stored in the storage unit for an entry in which the value of the first attribute matches designated conditions and reads the value of the second attribute stored in the entry, and thus, the CPU 2000 can acquire the value of the second attribute associated with the first attribute that satisfies the predetermined condition.

The foregoing programs or modules may be stored in an external recording medium. Examples of the external recording medium include, in addition to the flexible disk 2090 and the CD-ROM 2095, an optical recording medium, such as a DVD and a CD, a magneto-optical recording medium, such as an MO, a tape medium, and a semiconductor memory, such as an IC card. Alternatively, a storage unit, such as a hard disk or a RAM provided in a server system connected to a dedicated communication network or the Internet may be used as the recording medium, and the programs or modules may be provided to the computer 1900 via the network.

Although the present invention has been described using an embodiment, the technical scope of the present invention is not limited to the scope of the embodiment. It will be obvious to those skilled in the art that various changes and modifications of the embodiment may be made. It will also be obvious from the scope of the invention that such changes and modifications are also included in the technical scope of the present invention.

It is to be understood that the processes, such as the operations, procedures, steps, and stages of the devices, systems, programs, and methods shown in the Claims, specification, and drawings, can be achieved in any execution sequence, unless otherwise specified, such as "before" and "prior to", and unless the output of previous processing is used in the following processing. Even if the scope of the Claims, specification, and operation flows in the drawings are described using "first", "second", etc. for the purpose of convenience, it is not absolutely necessary to execute the operation in this order.

REFERENCE SIGNS LIST

10: computing system
12: information processing unit
22: update component
24: detection component
26: collection component
28: determination component
30: management computer
40: virtual machine
100: network
1900: computer
2000: CPU
2010: ROM
2020: RAM
2030: communication interface
2040: hard disk drive
2050: flexible disk drive
2060: CD-ROM drive
2070: input-output chip
2075: graphic controller
2080: display
2082: host controller
2084: input-output controller
2090: flexible disk
2095: CD-ROM

What is claimed is:

1. An inspection apparatus for inspecting an information processing unit to which a software update is applied, the apparatus comprising:
    a computer processing unit and non-transitory memory;
    a collection component configured to collect behavior of the information processing unit to which a same software update is applied a plurality of times; and
    a determination component configured to compare the behavior collected for each of the plurality of times that the same software update is applied to one another to determine whether behavior of the information processing unit after the software update is applied thereto is normal.

2. The inspection apparatus according to claim 1, further comprising:
    an update component configured to apply the software update to a same kind of a plurality of information processing units, wherein at least one of a system configuration, a setting, and an operating environment is common for the same kind of the plurality of information processing units;
    wherein the collection component collects behavior of the plurality of information processing units to which the software update is applied.

3. The inspection apparatus according to claim 2, wherein the update component applies the software update to some of a plurality of information processing units in an information system and applies the software update to other information processing units in the information system under a condition that the determination component determines that behavior of the some of the information processing units to which the software update is applied is normal.

4. The inspection apparatus according to claim 3, wherein the determination component determines whether behavior of the other information processing units after the software update is applied is normal based on a criterion changed from a criterion for determining whether the behavior of the some of the information processing units is normal after the software update is applied thereto.

5. The inspection apparatus according to claim 1, further comprising:
    an update component configured to repeat a process of backing up a state of the information processing unit, applying the software update, restoring the information processing unit to the state before the software update, and further applying the software update a plurality of times,
    wherein the collection component collects the behavior of the information processing unit for the plurality of times of the software update applied to the information processing unit.

6. The inspection apparatus according to claim 5, wherein the update component repeats a process of storing an image of a virtual machine that virtually implements a configuration of the information processing unit and applies the software update to the virtual machine of the stored image a plurality of times; and
    the collection component collects behavior of the virtual machine.

7. The inspection apparatus according to claim 1, further comprising:
an update component configured to apply the software update to the information processing unit and apply the software update to a virtual machine that virtually implements the processing of the information processing unit before the software update is applied,
wherein the collection component collects the behavior of the information processing unit to which the software update is applied and behavior of the virtual machine to which the software update is applied.

8. The inspection apparatus according to claim 1, wherein the determination component compares the behavior collected for the plurality of times of software update after the software update is applied until at least a change occurs in the behavior due to the software update.

9. The inspection apparatus according to claim 1, wherein the collection component collects behavior of data transmission and reception of the information processing unit as the behavior of the information processing unit.

10. The inspection apparatus according to claim 1, wherein the collection component collects behavior of a program and function that the information processing unit implements as the behavior of the information processing unit.

11. The inspection apparatus according to claim 1, wherein the collection component collects behavior of writing to and reading from a memory of the information processing unit as the behavior of the information processing unit.

12. The inspection apparatus according to claim 1, wherein the collection component collects the state of a resource constituting the information processing unit as the behavior of the information processing unit.

13. The inspection apparatus according to claim 1, wherein the collection component collects behavior of calling a system call in the information processing unit as the behavior of the information processing unit.

14. The inspection apparatus according to claim 1, wherein the collection component collects behavior of a physical quantity influenced by operation of a device that the information processing unit controls as the behavior of the information processing unit.

15. The inspection apparatus according to claim 14, further comprising:
a detection component provided in correspondence with the information processing unit and configured to detect the behavior of a physical quantity influenced by operation of a device controlled by the corresponding information processing unit or operation of the corresponding information processing unit itself,
wherein the collection component acquires parameters from the detection component provided in correspondence with the information processing unit to which the software update is applied.

16. A method for inspecting an information processing unit to which a software update is applied, the method comprising the steps of:
collecting behavior, for a plurality of times of software update, of the information processing unit to which the software update is applied; and
comparing the behavior collected for each of the plurality of times that the same software update is applied to one another to determine whether behavior of the information processing unit after the software update is applied thereto is normal.

17. A computer program product for inspecting an information processing unit to which a software update is applied, the computer program product comprising:
a non-transitory storage medium having computer readable program code embodied therewith, the computer readable program code configured to:
collect behavior of the information processing unit for which a same software update is applied a plurality of times; and
compare the behavior collected for each of the plurality of times that the same software update is applied to one another to determine whether behavior of the information processing unit after the software update is applied thereto is normal.

* * * * *